United States Patent [19]

Wiseman

[11] 4,134,024
[45] Jan. 9, 1979

[54] METHOD AND APPARATUS FOR GENERATING ELECTRICITY FROM THE FLOW OF FLUID THROUGH A WELL

[76] Inventor: Ben W. Wiseman, P.O. Box 5394, Midland, Tex. 79701

[21] Appl. No.: 830,465

[22] Filed: Sep. 6, 1977

[51] Int. Cl.² .............................................. H02K 7/18
[52] U.S. Cl. ....................................... 290/52; 290/54; 166/65 R
[58] Field of Search ............................ 290/43, 52, 54; 60/DIG. 2; 204/196; 322/7, 10–16; 166/266, 267, 65 R; 137/802

[56] References Cited

U.S. PATENT DOCUMENTS

| 1,752,844 | 4/1930 | Harrison | 320/61 |
| 2,276,714 | 3/1942 | Brown | 290/54 |
| 3,776,279 | 12/1973 | O'Connor, Jr. | 290/55 |

Primary Examiner—Robert K. Schaefer
Assistant Examiner—M. K. Mutter

Attorney, Agent, or Firm—Gerald G. Crutsinger; Larry B. Dwight

[57] ABSTRACT

A method and apparatus for generating electricity from a generator driven by the flow of fluid flowing from a fluid producing well. A fluid driven motor is positioned in the pipeline adjacent to or above the well head such that the fluid passes through the motor to turn the motor shaft to drive the generator. By controlling the electrical load connected to the generator, the force required to drive the motor and thereby the pressure reduction across the motor can be controlled. The electricity produced by the generator may be used to heat the fluid in the pipe to prevent freezing of the fluid. The electricity can be utilized to heat the emulsion in an emulsion separator dehydrator for separating gas, water, and oil prior to its introduction into the pipeline. Separate motor may be utilized for gaseous fluid and liquids. Where the well produces both gas and liquid a separator is employed to separate the gas and liquid.

10 Claims, 7 Drawing Figures

METHOD AND APPARATUS FOR GENERATING ELECTRICITY FROM THE FLOW OF FLUID THROUGH A WELL

BACKGROUND

Fluid pressure at the well head generally ranges from 200 to 5000 pounds per square inch and is generally reduced to a pressure of 1000 pounds per square inch or less by delivering the fluid through a choke before the fluid enters a pipe line to a storage tank. A typical choke comprises a flow passage with a fixed diameter or one in which the flow passage may be varied by turning a valve. Significant refrigeration or cooling of the fluid occurs when the fluid at 5000 pounds per square inch passes through an orifice in the choke and expands into the line at 1000 pounds per square inch. The resultant refrigeration causes formation of frost on the surface of the pipe line and may result in freezing the fluid within the pipe line thereby blocking the passage of the fluid through the line.

Heretofore, heaters have been employed to transfer heat to the fluid which is passed through the choke. Heretofore, a portion of the gas or oil produced by the well has been burned to heat air in a heat exchanger formed around the choke or pipe line.

Burning of fuel gas or oil from the well for heating fluid produced by the well in some instances results in consumption of significant percentages of the fuel produced by the well. It is often necessary to provide a source of gas, for example butane, for heating liquid to separate water from oil if an insignificant volume of gas is produced by the well to provide the required heat. This results in waste of that portion of gas which is burned to heat the pipe line or results in a costly expenditure to provide other hydrocarbon type fuels for heating the liquid for separation of the fluid produced or for heating to prevent freezing.

Wells generally produce an emulsion of oil, gas and water and various other liquids which are very corrosive in nature. Before introduction of the fluid into the pipe line, it is desirable to separate the gas and water from the oil. An emulsion separator is often used comprising a holding tank. The emulsion is delivered into the upper portion of the tank and a heater is positioned below the tank to heat the emulsion. The heat causes the gas to boil off and the gas is piped off at the top. Warm oil will float to the top while the water goes to the bottom. The oil is syphoned off and the water is drained off of the bottom. Heretofore these devices have utilized gas or oil burners which have consumed a portion of the gas or oil from the well or must be supplemented with butane and, therefore, consumes more of the fuel being produced.

SUMMARY

I have devised a process and apparatus for generating electricity to reduce the pressure of fluid flowing from the well head to the pipe line and to use the electricity to heat the pipe line and separate the emulsion into gas, water, and oil. The apparatus utilizes the energy heretofore lost when using a conventional choke to reduce pressure adjacent the well head.

In a typical oil or gas well, a well head is positioned above the casing to control the flow of fluid from the well. A motor is positioned within the casing or downstream from the well head such that the fluid flows through the motor to drive the motor and turn the output shaft. The output shaft is connected to a gear reduction transmission which is drivingly connected to a generator. After the fluid passes through the motor, it passes into a pipe line to be connected with other wells for transfer to a storage facility.

In wells which produce both liquid and gas, a separator such as a gas separator inducer is placed in the casing of the well or downstream from the well head to preliminarily separate the liquid and gas. The liquid passes through a liquid driven motor. The gas is diverted through a gas driven turbine or a positive fluid driven motor which drives a separate generator.

The power required to drive the generator is directly proportional to the electrical load connected to the generator such that a larger load on the generator requires more power to drive the generator. Therefore, by controlling the electrical load by a series of heaters and resistors connected to the generator, the power required to drive the generator can be controlled and, therefore, the pressure reduction across the motor can be controlled. In most wells the fluid pressure needs to be reduced and it is desirable to utilize the energy given up by the fluid in reducing the pressure in a useful manner.

The electrical power generated by the generator can be utilized to heat the pipe line or choke to prevent freezing of the pipe line in cold weather. In case of a low pressure well, electricity generated by fluid flowing from another well may be used to pump fluid from the low pressure well through the pipe line to increase the pressure to a desired line pressure.

In addition, the electricity is used to power electric heating units, such as Calrods, in an emulsion separator treatment tower which separates the gas, oil, and water.

The primary object of the invention is to utilize the energy of the high pressure fluid flowing from a well in a useful manner to reduce wasteful consumption of hydrocarbon fuels or loss of energy at the well site.

Another object of the invention is to produce electricity which may be utilized in transferring heat to the fluid in the pipe line to maintain the flow of fluid in the pipe line.

A still further object of the invention is to produce electricity at the well head of a high pressure well which may be utilized to increase the flow of fluid through a pipe line from a lower pressure well.

A still further object of the invention is to provide electricity which may be utilized to produce heat in an emulsion separator tower in place of burning hydrocarbon fuels.

A still further object of the invention is to control the pressure reduction adjacent the well head in a manner which will not result in freezing liquid in the pipe line by forcing the fluid to flow across a loaded motor or turbine.

Other and further objects of the invention will become apparent upon reading the detailed description hereinafter following and studying the drawings annexed hereto.

DESCRIPTION OF THE DRAWINGS

Drawings of a preferred embodiment of the invention are annexed hereto, so that the invention may be better and more fully understood, in which.

DESCRIPTION OF A PREFERRED EMBODIMENT

Figure 1:
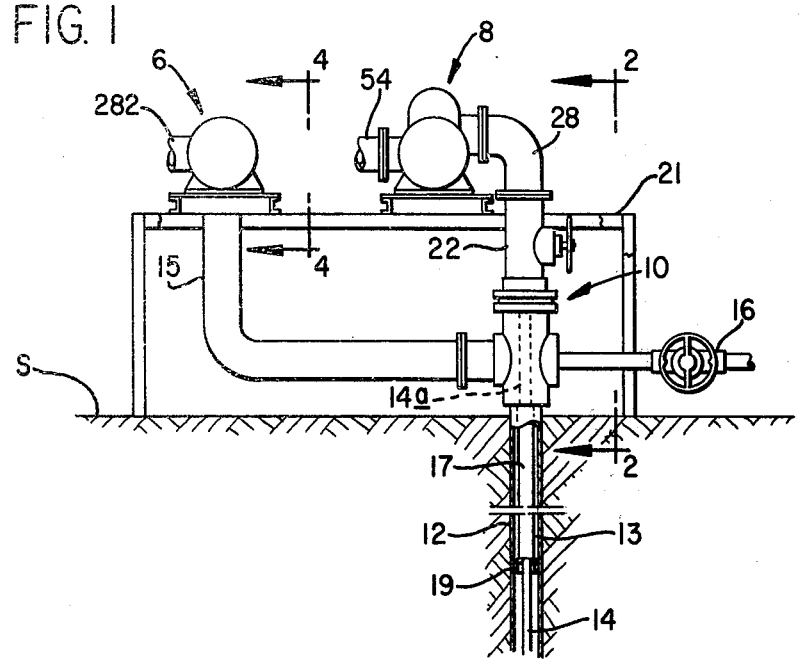
FIG. 1 is a diagrammatic view of a separator in a well with a fluid driven motor and gas driven turbine.

Referring to FIG. 1 of the drawing, the electrical generator devices 6 and 8 are positioned on a well head 10. The well head 10 is secured to the well casing 12 which has a tubing string 14 to form an annulus 13. Tubing 14 is connected to the oil generator device 8 and the annulus 13 communicates with pipe 15 which communicates with the gas generator device 6.

Means to separate the fluid and gaseous substances is positioned in the well casing 12. This device can be positioned at any position along the length of the well casing 12 or as illustrated at the surface S as shown in FIG. 1 of the drawing. The means to separate gas and liquid comprise various configurations, one such device is an electrically driven separator manufactured by FMC and designated Model SO-C Gas Separator/Inducer. The fluid gas separator 17 is positioned on the tubing 14 just above a seal unit 19 and utilizes basic centrifugal forces to separate the gas from the liquid. The liquid moves outwardly and is diverted to the center tubing 14 which communicates with tubing 14a to *the oil generator device 8. The gas remains in the center and is diverted into the annulus 13 which communicates with pipe 15 and which is connected to the gas generator device 6. The pressure within the well may be between* 200 and 5000 psi. The pump may be necessary to lift the liquid the remaining distance.

Suitable support means 21 is provided above well head 10 to support the generating devices 6 and 8. As best illustrated in FIGS. 1 and 2, the generating device 8 for the oil fluid generally comprises a fluid driven paddle type generator motor 24 and a device for the generation of electricity from the gaseous substances generally comprises a turbine motor 224.

Figure 2:
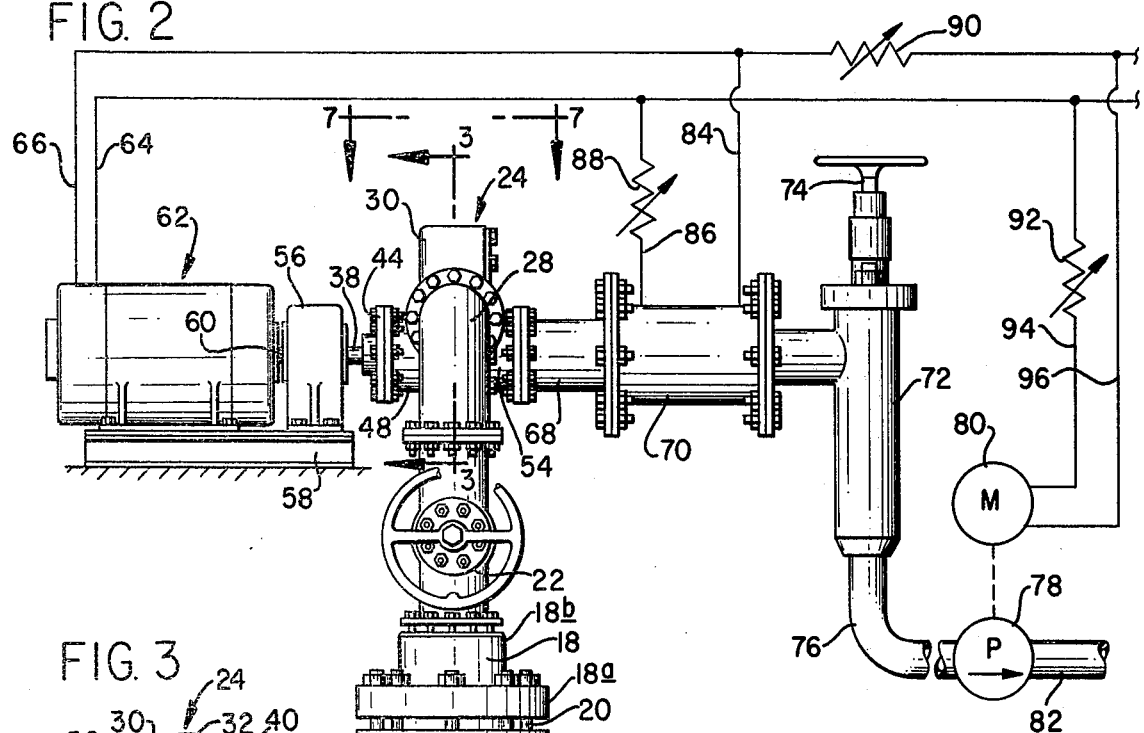
FIG. 2 is an enlarged side elevational view illustrating the fluid driven motor — generator, parts being broken away to more clearly illustrate the details of construction, with diagrammatic wiring connections, said view taken along line 2—2 of FIG. 1.
Figure 3:
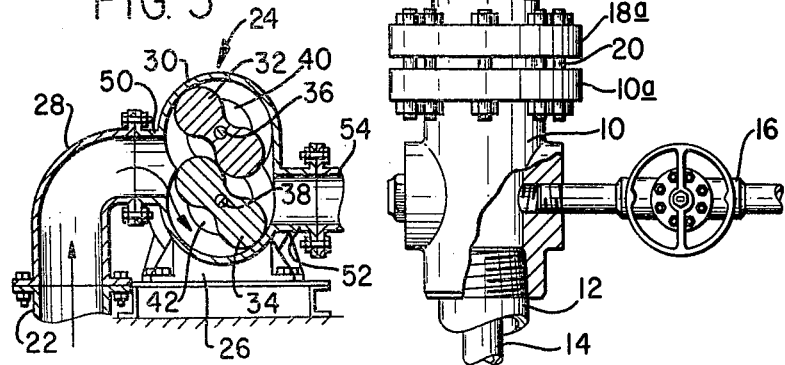
FIG. 3 is a cross-sectional view taken along line 3—3 of FIG. 2.

As best illustrated in FIGS. 1, 2, and 3, generator 8 is secured above the well head 10 which is bolted to a pipe adaptor 18 by bolts 20 which secure flange 10a *of well head 10 and flange 18a* of adaptor 18 together. A flow control valve 22 is secured at one end to the upper flange 18b of adaptor 18 to control the flow of fluid upward from the well. The motor 24 is secured to support bracket 26 to the well platform and communicates with the well by elbow 28 secured between valve 22 and motor housing 30.

Motor 24 may be of any type of fluid driven motor, such as the one illustrated in FIG. 2, showing a rotary paddle type motor comprising impellors 32 and 34 which are secured to shafts 36 and 38. Impellor 32 on shaft 36 rotates gear 40 which drives gear 42 on drive shaft 38. Drive shaft 38 is journalled through seal 44 at one end of the motor shroud 48.

Inlet flange 50 communicates with elbow 28. Fluid passes through elbow 28 to housing 30 and rotates impellors 32 and 34, and passes through exhaust shroud 52 into elbow 54.

Drive shaft 38 is connected to a gear reduction transmission 56 which is bolted and secured to support means 21 by bracket 58. Transmission 56 has an output shaft 60 which is connected to a generator 62.

Depending upon the desired type of current needed, generator 62 can be used to produce alternating or direct current. Generator 62 is bolted or otherwise secured to support bracket 58 to maintain alignment of the shafts 38 and 60. Generator 62 has output lines 64 and 66 to conduct the electrical current.

Adaptor 68 is bolted or otherwise secured to an electric heating element 70 which comprises an electric heating element wound about the pipe core to heat the fluid as it passes through that section of the pipe. Choke 72 comprising a variable type choke having a handle 74 for adjusting flow therethrough is secured in the pipe line between heater 70 and pipe line 76. A pump 78, diagrammatically illustrated in FIG. 1, is drivingly connected to an electric motor 80. Pump 78 pumps fluid into pipe line 82.

Figure 4:
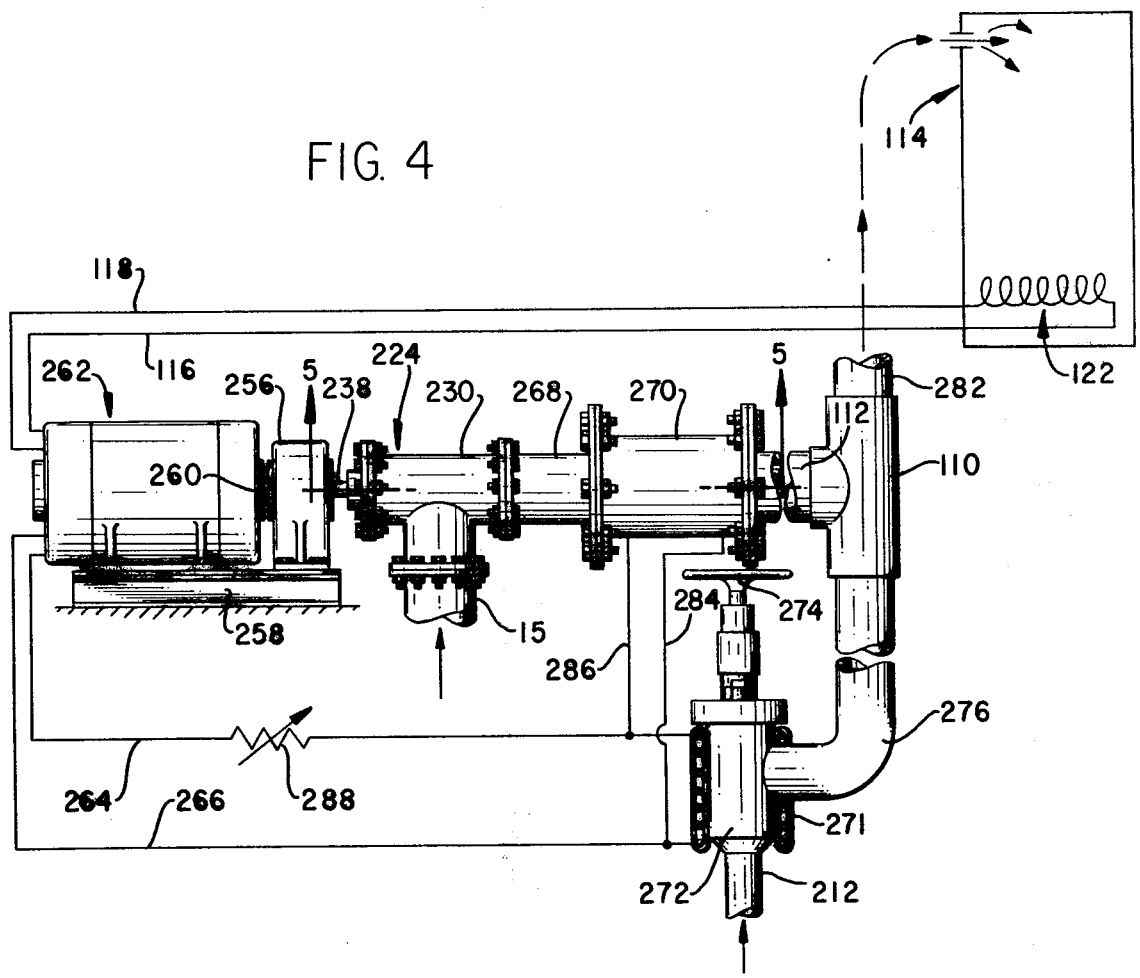
FIG. 4 is an enlarged side elevational view of the gas driven turbine taken along line 4—4 of FIG. 1 in association with a second well and an emulsion separator.
Figure 5:
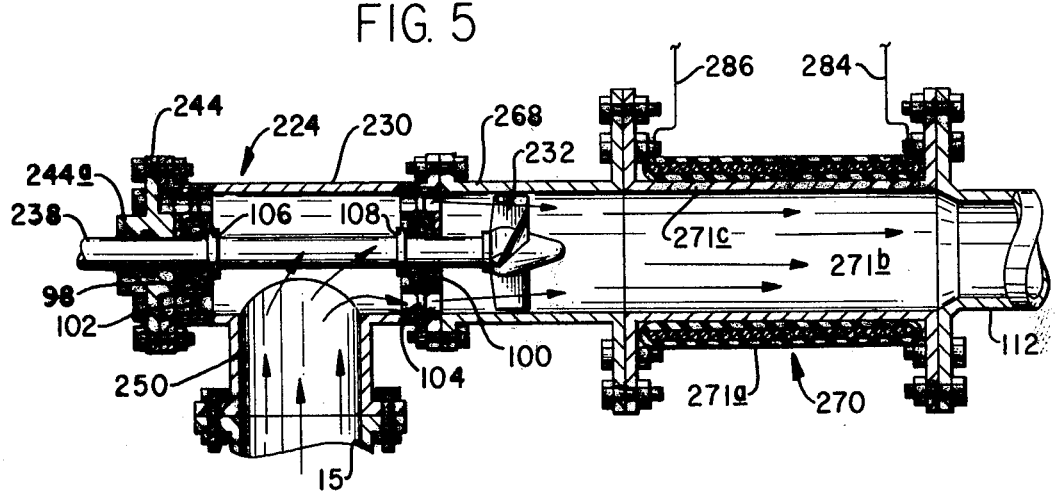
FIG. 5 is a cross-sectional view taken along line 5—5 of FIG. 4 which is enlarged to more clearly illustrate the details of construction.
Figure 6:
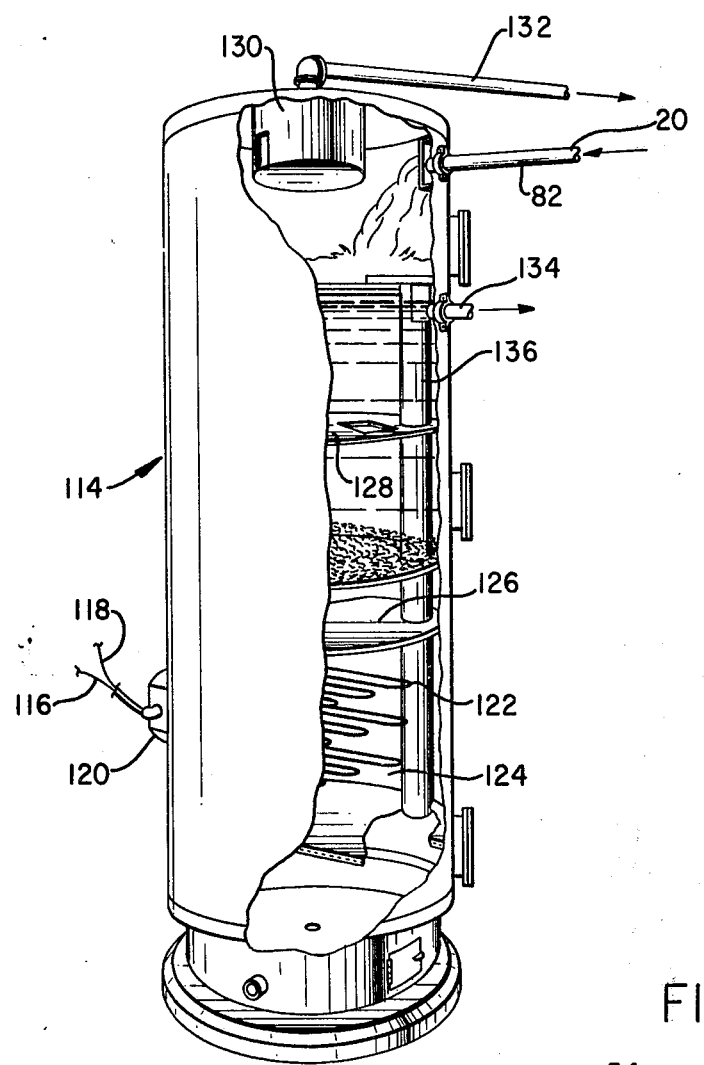
FIG. 6 is a perspective view of an emulsion separator, parts being broken away to more clearly illustrate the details of construction.
Figure 7:
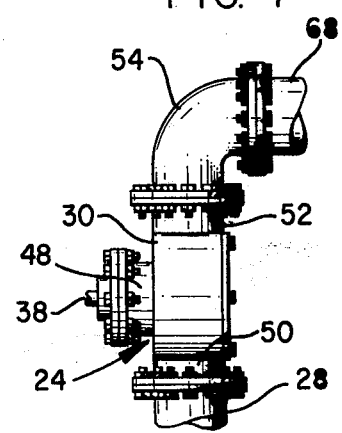
FIG. 7 is a plan view taken along line 7—7 of FIG. 2.

As best illustrated in FIGS. 4 and 5, the gas generating device 6 comprises a turbine shroud 230. Shroud 230 is T-shaped having an outlet 255 with communicates with pipe 15 and well head 10.

The turbine shaft 238 is journalled through support means such as roller thrust bearings 98 and 100 secured in bearing supports 102 and 104. Bearing support 104 has hollow passages formed therethrough to allow the flow of fluid through the support 104. Turbine shaft 238 has bearing shoulders 106 and 108 formed thereon to limit longitudinal movement of the turbine shaft 238. End cap 244 has seals 244a *to seal about shaft 238.*

The turbine blades 232 are secured to the end of shaft 238 in turbine shroud 268 which is bolted or otherwise secured to housing 230. Fluid passes from the well casing annulus 13 into the well head 10, pipe 15 and shroud 230 and passes through the bearing support 104, and blades 232 to turn shaft 238.

As illustrated in FIG. 4, shaft 238 is connected to transmission 256 which is drivingly connected to generator 262 by shaft 260 as previously described. The output terminals of generator 262 are connected to lines 264 and 266. Lines 264 is connected to rheostat 288 to control the current to heater 270.

As best illustrated in FIG. 5, heater 270 comprises a shield 271a of non-conductor material which surrounds heater element 271b. Heater element 271b is wrapped around the core element 271c. Conductors 284 and 286 are connected in parallel to conductors 264 and 266 to provide current to heat 270. A second heater 271 may be connected to lines 264 and 266 on a second well as illustrated in FIG. 3. The well may be in the adjacent vicinity or further away. Heater 271 is wrapped about a choke 272 having a control handle 274 to control the flow of fluid from the second well casing 12' into outlet line 276. Connector means 110 connects the output line 112 from turbine motor 224 to output line 276 of the second well.

Several wells are generally connected together on a common pipe line to reduce the number of pipe lines which are laid to carry the fluid to storage tank. Once the desired pressure has been determined on the pipe line, it is necessary to adjust each well to produce that pressure to maintain flow through the pipe line. For instance, the pipe line pressure may be established at 1000 psi and the well may be producing 5000 psi. It would be necessary to reduce the well pressure of 5000 psi down to 1000 psi to control the pipe line pressure.

The force necessary to rotate generator 62 to produce electricity is controlled by a load across conductors 64 and 66. The force is adjusted by controlling the electrical load on the generator. A heater 70 is connected by conductor 84 to line 66 and by conductor 86 through a rheostat 88 to line 64. Rheostat 88 controls the amount of electricity which passes through heater 70 to control the load on generator 62. Further a rheostat 90 is positioned in a series in line 66 to further control the load on generator 62. A motor speed control, such as rheostat 92 is connected in series between line 64 and first input of motor 80 by line 94. The ground of motor 80 is connected by line 96 to line 66. When necessary to increase the pressure of fluid flowing into line 82, pump 78 motor 80 is actuated. The speed of motor 80 is controlled by rheostat 92. Line 66 and 64 may be connected to other electrical devices such as lights at the well head or at other wells which do not produce enough fluid pressure to allow generation of electricity by the method hereinbefore described.

By controlling the load on generator 62, the power requirements to drive generator 62 are controlled. Motor 24 will reduce the pressure from the inlet 50 to the outlet 52 which is directly proportional to the power requirements of generator 62. Therefore, by controlling the load on generator 62, the pressure drop from the inlet 50 to the outlet 52 may be controlled. On cold days, heater 70 is utilized to constitute a portion of or all the load on generator 62 to control pressure dropped across motor 24 thus causing less refrigeration as the fluid flows through choke 72.

Output line 282 is connected to a means to separate the fluid such as emulsion separator tower 114. Lines 116 and 118 are connected across the output terminals of generator 262 to provide a means to heat the separator tower 114. As best illustrated in FIG. 5, lines 116 and 118 are connected to junction box 120 which are connected to a heater means 122 such as resistant type heating elements. Heater means 122 are spaced in the lower compartment 124 of separating tower 114. The tower 114 comprises a compartmented container being sealed by a bottom plate 146 to prevent leakage into the lower compartment 124 where the heater means 122 is located. Fluid from output line 282 is dumped into the upper portion of the container 124 and a baffle plate 128 allows the water to separate from the oil mixture in the upper portion of the container. Heater means heats the mixture causing the gas to boil off which is collected by gas outlet 130 and piped off by conduit 132. The oil is syphoned off through oil outlet line 134 which communicates with oil storage tanks. Conduit 136 provides an emulsion down line which communicates with a water drainoff valve. Hot oil will float to the top of the water. It is desirable to separate the water from the oil to prevent corrosion of the oil pipe line.

The output of several wells may be combined to flow into a single separator 114 and electric power generated from the output of a single well or multiple wells may be used to heat the emulsion to separate the emulsion into oil and gas. The separated oil and gas may be placed in separate storage facilities and/or separate pipe lines as desired.

It should be readily apparent that any electrical device used in or about a well site may be connected to the generator for increasing the electrical load. Such devices may include electric clock for intermitters, electrically driven chemical pumps or any other type of electric device.

From the foregoing it should be readily apparent that the invention accomplishes the objects of the invention hereinbefore set forth.

It should also be readily apparent that other and further embodiments of the invention may be devised without departing from the basic concept thereof.

Having described my invention, I claim:

1. A process for reducing pressure of a fluid producing well by generating electricity comprising the steps of: directing the flow of fluid through a fluid driven motor; connecting the output shaft of the fluid driven motor to an electrical generator; loading the electrical generator to produce a load on the motor; controlling the load on the electrical generator to control the pressure drop across the motor.

2. The process called for in claim 1 wherein the step of loading the electrical generator comprises: attaching an electrical heating unit to the generator; and positioning the electrical heating unit about an output pipe of the motor to heat the fluid passing therethrough.

3. The process of producing electricity to heat fluid passing through the pipe comprising the steps of: directing the flow of fluid through a fluid driven motor; connecting the output shaft of the fluid driven motor to a gear reduction transmission; connecting the gear reduction transmission to an electrical generator; connecting a heating element circuit across the output terminals of the electrical generator; positioning the heating element about the portion of the conduit to be heated such that heat is transferred from the electrical heating element to the pipe to heat the fluid flowing therethrough; controlling the resistance of the heating element circuit to control the pressure drop across the fluid driven motor.

4. The process of producing electricity for separating a fluid emulsion produced from a well comprising the steps of: directing the flow of fluid through a fluid driven motor; connecting the output shaft of said fluid driven motor through an electrical generator; connecting conductors across the output terminals of said electrical generator; connecting the conductors to a heating element circuit in a bottom of a separation tower; delivering the emulsion into the upper portion of said tower; heating the emulsion to a predetermined temperature; collecting the gas which boils off the emulsion; syphoning off any oil fluid from the upper portion of the emulsion and draining off the water from the lower portion of the emulsion; controlling the resistance of the heating element circuit to control the pressure drop across the fliud driven motor.

5. Apparatus for generating electricity from the fluid pressure of a well comprising: a fluid driven motor having an inlet side and an outlet side; a well head; means securing the outlet of said well head to the inlet of said fluid driven motor; an output shaft rotatably driven by said fluid driven motor; a generator; means securing said output shaft of said fluid driven motor to said generator; a pipe line; means securing the outlet of said fluid driven motor to the pipe line; electrical conductor means connected to the output terminals of said generator load means; and means for controlling the load on the generator to control the pressure drop across the fluid driven motor.

6. The combination called for in claim 5 wherein said load means comprises: electric heater means secured about the outlet of said fluid driven motor; and connector means to connect the electric heater means to said electrical conductor means.

7. The combination called for in claim 5 with the addition of: an electrically driven centrifugal separator operably connected to said well, said separator adapted to separate the gas from the fluid produced by the well; a gas driven motor; means communicating between the centrifugal separator and gas driven motor to direct the flow of gas through the gas driven motor; a second electrical generator for producing electricity.

8. The combination called for in claim 5 with the addition of: an electrically driven compressor operably connected to a pipe line, said electrically driven compressor adapted to increase the pressure of fluid in a pipe line; and connector means connecting said electrically driven compressor to said electrical conductor means.

9. The combination called for in claim 5 wherein said load means comprises lights operably connected to said electrical conductor means.

10. The combination called for in claim 5 wherein said load means comprises: a electrically driven pump adapted to pump fluid into said pipe line, said pump being connected to said electrical conductor means.

* * * * *